July 24, 1951 A. BUSTANOBY 2,561,971

PHONOGRAPH-PICTURE EXHIBITOR

Filed May 21, 1949

INVENTOR

ANDRE BUSTANOBY

BY Robert B. Terry

ATTORNEY

Patented July 24, 1951 2,561,971

UNITED STATES PATENT OFFICE 2,561,971

PHONOGRAPH-PICTURE EXHIBITOR

André Bustanoby, Glencoe, Mo.

Application May 21, 1949, Serial No. 94,665

4 Claims. (Cl. 88—16)

This invention relates to improvements in picture-exhibitor phonograph combinations, and more particularly to a low-cost assembly of elements for use in functional combination with a record player or the like, to produce an illusion of motion, concurrently with the playing of sound records of usual or other types.

Incident to an increasing distribution of musical and narrative records for children, there exists a concomitant requirement for a moving picturization of objects or characters identified or correlated with the themes or subjects whose voices or sounds are recorded. The present invention accordingly has the major objective of supplying at a moderate cost, certain physical facilities for realizing this result.

The present invention may be summarized by reference to the elements of a typical embodiment as including a circular disc carrying a circular row or series of figures, so related that when viewed in rapid succession there results a simulation of motion. With such a disc is utilized an apertured scanning element on a journalling support therefor, if the scanning element be rotatable; also a drive attachment for the scanning element, assuming its rotation, and so arranged that the scanning element is directly powered from the record or record table of the player.

Among the many objectives of the present improvements, there may be further noted an embodiment in a low-cost, light-weight accessory or attachment for use with presently available record players; the provision as an article of manufacture, of a sound record of disc-type which may have impressed thereon or attached thereto the aforesaid circular series of images or figures, together with a unique scanning or viewing disc and a drive therefor, all of which are readily and easily attached to a record player and as quickly and easily removed therefrom, without special skill and without the requirement of tools.

The foregoing and numerous other objects and advantages will more clearly appear from the following detailed description of a currently preferred embodiment of the invention, particularly when considered in connection with the accompanying drawings, in which.

Figure 1:
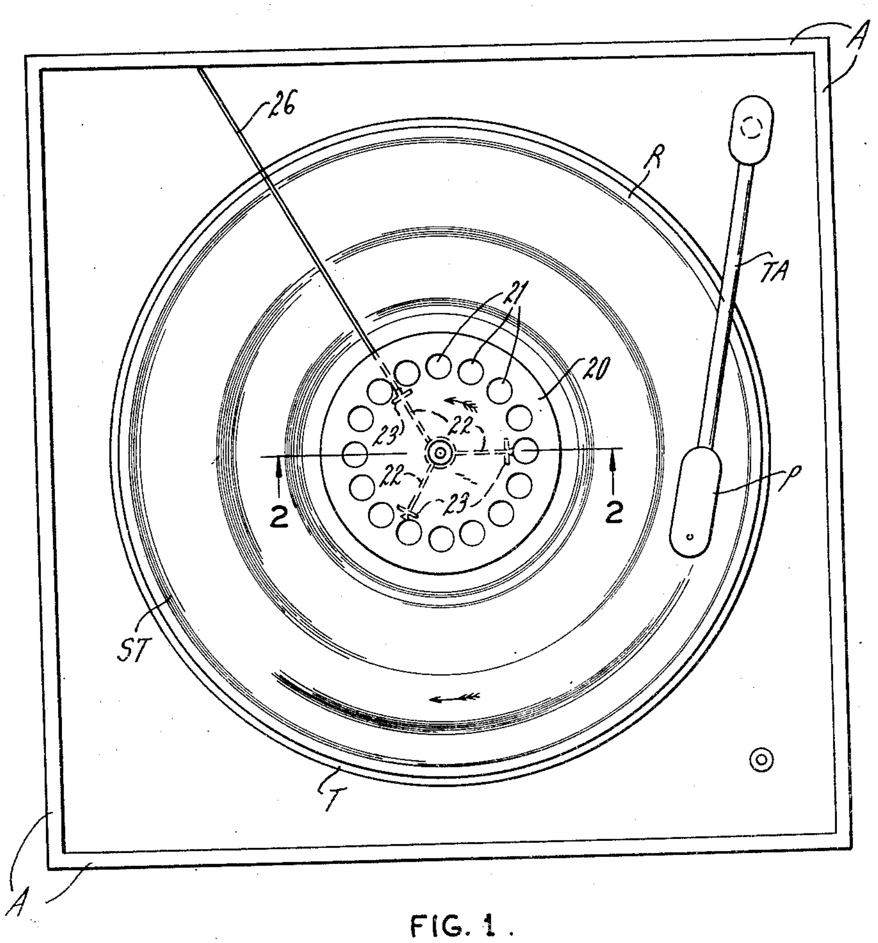
Fig. 1 is a top plan view of a record player and record to which the present improvements are assembled in operative relation.
Figure 2:
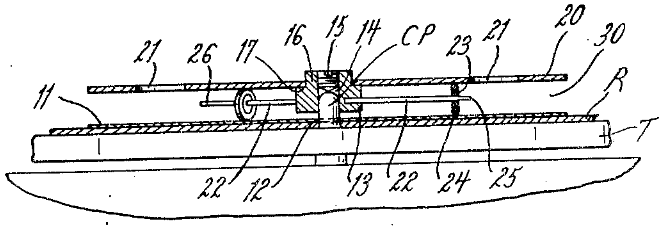
Fig. 2 is a view in a vertical plane, somewhat enlarged, showing in vertical section certain of the attachment features.

Referring now by characters of reference to the drawing, Fig. 1 represents the top portion of a conventional record player or phonograph, including a top cabinet portion with the flange sides A forming the usual shallow, top-open well, centrally of which is rotatably supported the record table T, and above which projects vertically and axially of the table, a center post CP (Fig. 2). Disposed over the table T and frictionally driven thereby is a record R, shown as of disc or planar type, the sound track area of which is pointed out at ST. The usual instruments will obviously include a driving motor (not shown) for rotating the table T at constant predetermined speed, together with a pick-up P, a tone arm TA, together with amplifier, speaker and other equipment which may be conventional. Since none of the elements thus far described constitutes either of itself, or in the combination as thus far noted, any part of the present improvements apart from the combination, no detail of description or illustration thereof is regarded as necessary for completeness.

Figure 3:
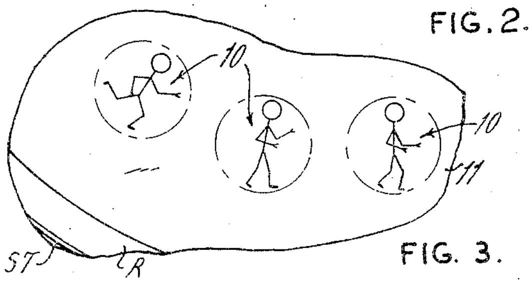
Fig. 3 is a fragmentary portion of a phonograph record, together with certain of the pictorial characters of the circular or arcuate series thereof, resulting upon rotation of the record, in the kaleidoscopic images.

The record R carries a circular or arcuate series of evenly spaced pictorial representations of some figure or figures identified in some way or correlated with a character, object or event depicted by the sound track of the record, Fig. 3 showing a view of such pictorial representations as indicated at 10. The pictorial representations 10 may be imprinted upon the center disc area of the record proper, or alternately, may be impressed upon a separate circular disc 11 of paper, cardboard, sheet plastic or the like which may be adhesively secured in the manner of the usual center label of a disc type record, or alternately, the disc 11 may consist of a separate, usually circular disc of sheet material applied over the record proper and located thereon through a central aperture 12 which receives the center post CP, thus locating the disc 11 accurately with respect to the record.

Mounted upon the center post CP is a journalling support or bushing 13 which is provided with a central bore 14, the upper portion of which is tapped to receive an externally threaded screw plug 15. The bushing 13 is preferably formed to present a larger diameter in its lower portion, as best shown by Fig. 2, and is characterized by a somewhat reduced part 16 in its upper portion so that there results at the junction of the upper reduced section 16 and the lower part, a horizontal annular shoulder 17. The shoulder 17 serves as a central support and as a journal portion for an apertured viewing or scanning disc 20, the shoulder 17 serving to locate the disc 20 in a plane parallel to but spaced above that of the record R, and the plane of the disc 11, if same be separate, containing the kaleidoscopically related pictures or images.

The scanning disc 20 is a viewing agency as will appear, and is provided with a circular series of viewing apertures shown as, but not necessarily being of circular shape, as indicated at 21. The viewing apertures are each located at substantially the same radial distance from the axis of rotation of the table and record, as are the images 10 on the record or the separate disc 11 as the case may be, the viewing apertures being indicated at 21.

It is preferred to provide for rotation of the viewing or scanning disc 20, and in a low cost assembly such as that described, the rotative actuation of the viewing disc is easily obtainable from the record R or table T as a power source. Such driving means consists in the presently illustrated example, of a plurality, shown as three, of equally angularly spaced radial arms 22, each of which is horizontally fitted into a suitable socket in the journalling support or bushing 13. This connection may be a press fit as shown, or optionally, the radial arms may be threaded into the member 13, thus facilitating their detachment for packaging, shipment and storage. Each of the arms 22 serves as a support for a rotatable frictional drive wheel 23, each of which may consist of paired sheet metal discs provided with a peripheral groove for the reception of an annular tire or tread element or the like, indicated at 24, and which may consist of an elastic ring of rubber or similar material. The wheels 23 are retained on arms 22 as by a flattened or otherwise deformed end 25 on each of the arms.

In a commercial form of the assembly it is desirable to avoid any direct attachment to parts of the cabinet or other element of the player, as making for quickness and ease of attachment of the present accessories and their removal, inasmuch as the device is quite effectively employed in and for children's records, although by no means restricted to such field of usage. It is of course an incident of the rotation of the center post CP that a turning moment is imparted to the journalling support or bushing 13, and since such rotation could not be accurately controlled, it has been found advisable to maintain the journalling support stationary. To this end the bushing member 13 is provided with an extended stay-arm 26 which has one of its ends fitted into the journalling bushing 13, conveniently in the same manner as the wheel arms 22. The length of the rod 26 is such that it will abut one of the sides A of the cabinet structure, and thus will serve to prevent rotation of the journalling support, no attachment of the arm to the cabinet being necessary.

The functions of the assembly and the operative relation of the several parts are thought to have become apparent from the foregoing description of structure, but it may be noted for completeness that, assuming the table T and record R to be rotating at the normal predetermined rate, with the playing arm TA and the pickup in place, with the needle engaging the sound groove or track of the record, the frictional engagement of the several tires 24 on wheels 23 with the center area of the record will occur along a circular path, this circle being located either radially inside or outside of the circle of kaleidoscopic images 10 heretofore described. The rotation of the wheels 23 will, now obviously, serve to rotate the disc 20 at the rate of the table and record, but in an opposite direction from that of the record R. The operator, to receive the illusion of motion, selects any given eye position above the record player fitted with the attachment, and from such position, views through the apertures 21 of the scanning or viewing disc as same traverse the line of sight, the successive pictures or images 10, the latter being as above noted, a series of characters or objects depicted by the musical, narrative or other theme of the record.

It will be noted that the spacing between the image disc 10 or circular row of images on the record, and the disc 20, is such as to provide a vertical clearance therebetween as indicated by the numeral 30, which distance is entirely sufficient to accommodate the pickup and tone arm, as these traverse the sound-area of the record, without any physical interference with the disc 20.

It will have been noted as desirable to assure that the disc 20 rests lightly upon and yet makes a sufficient frictional driving contact with the several friction wheels 23. This fact, considering also that the height of the center post CP will vary somewhat in different record players, renders advisable and of considerable adjustment value the use of a member such as the threaded plug 15. It will now have appeared that, by threading the plug inwardly of the bore 14, the journalling support 13 and therewith the arms 22 and wheels 23 may be raised or lowered to assure their best operating contact with the record as well as with the disc 11 as the case may be, and at the same time acts to assure satisfactory operating contact between the wheels 23 and the disc 20. The manner of applying the attachment to a conventional record player will have become obvious, it being merely necessary after applying the record together with disc 11 if separate, over the center post and on the table, to lower the assembly including the bushing 13 and the appurtenances together with the scanning disc and stay arm, over the center post, which interfits the lower portion of bore 14 in the manner of a socket. Removal consists merely in lifting this assembly from the center post.

The improvements have been described by detailed reference to the parts and combinations of an attachment in the currently preferred form; such detail is to be understood solely in an illustrative, rather than in any restrictive sense, inasmuch as numerous variants are possible within the scope of the claims hereunto appended.

I claim as my invention:

1. In a phonograph-picture exhibitor combination, a record table, a center post on the record table, a record on the table, upon which there may be disposed a selected circular series of pictorial units rotatable with the record and located inwardly of the sound track area thereof, a disc spaced above the record and provided with a circular series of viewing apertures, with said apertures located on radii from the center post which substantially conform to the radial distances of the selected pictorial units therefrom, a journalling support for the disc located in the region of the center post, a plurality of angularly spaced arms carried by the journalling support, a disc driving wheel carried by each of said arms, each of said wheels engaging the record and further engaging the apertured disc to serve as a drive means for the disc to rotate same in timed relation to the table and the record.

2. A picture exhibitor attachment for a record player of a type adapted to receive upon the record an imprinted sheet provided with a circular series of kaleidoscopically related characters and provided with a central aperture enabling the sheet to be inserted over the center post of a record player, a disc having a circular series of apertures through which may be viewed the characters on the imprinted sheet, a journalling support for the apertured disc, said support having a socket to permit the support to be applied endwise upon the center post of the record player, a series of arms carried by the journalling support, friction wheels on said arms to serve as a drive connection between the table or record of the player, and the apertured disc, and an anchoring device preventing rotation of the journalling support.

3. In a picture exhibitor attachment for a record player, a socket member adapted to be carried by and to be applied over the outer end of the center post of the player, a record table and record adapted to receive on the record a selected pictorial disc having a circular row of kaleidoscopically related characters thereon, and centrally apertured to be inserted over the center post on the record, a plurality of angularly spaced arms carried by the socket member, the socket member having an annular shoulder above said arms adapted to receive in journalling relation a viewing disc, a viewing disc centrally apertured to extend over and be journalled upon the annular shoulder of the socket member, the viewing disc provided with a series of viewing apertures circularly arranged to correspond to the arrangement of characters on the selected pictorial disc, a plurality of drive wheels of small diameter carried by the radial arms of the socket member, and a stay arm secured to the socket member and adapted to prevent rotation thereof.

4. The combination and arrangement of elements as recited by claim 3, but characterized by the addition of a threaded adjusting screw extended depthwise of the upper end of the socket member and forming an adjustable stop for said member enabling a variation of height of the socket member above the record with which the device is used.

ANDRÉ BUSTANOBY.

REFERENCES CITED

The following references are of record in the file of this patent:

UNITED STATES PATENTS

| Number | Name | Date |
|---|---|---|
| 709,342 | Maxwell | Sept. 16, 1902 |
| 726,371 | Sutton | Apr. 28, 1903 |
| 1,658,030 | Adams | Feb. 7, 1928 |
| 1,913,913 | Boularan et al. | June 13, 1933 |
| 1,929,173 | Koch | Oct. 3, 1933 |
| 1,933,057 | Harkin | Oct. 31, 1933 |
| 2,021,817 | Tannenberg | Nov. 19, 1935 |
| 2,455,712 | Von Soden | Dec. 7, 1948 |